US010600222B2

(12) United States Patent
Nair

(10) Patent No.: US 10,600,222 B2
(45) Date of Patent: *Mar. 24, 2020

(54) COMMUNICATION APPARATUS WITH IN-CONTEXT MESSAGING

(71) Applicant: PAYPAL, INC., San Jose, CA (US)

(72) Inventor: Rahul Nair, Austin, TX (US)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/181,820

(22) Filed: Nov. 6, 2018

(65) Prior Publication Data

US 2019/0272656 A1  Sep. 5, 2019

Related U.S. Application Data

(63) Continuation of application No. 14/527,391, filed on Oct. 29, 2014, now Pat. No. 10,122,657.

(51) Int. Cl.
| | |
|---|---|
| *G06T 11/60* | (2006.01) |
| *H04L 29/08* | (2006.01) |
| *H04L 12/58* | (2006.01) |
| *G06F 3/0484* | (2013.01) |
| *H04M 1/725* | (2006.01) |

(Continued)

(52) U.S. Cl.
CPC ............ *G06T 11/60* (2013.01); *G06F 3/0484* (2013.01); *G06Q 10/10* (2013.01); *G06Q 10/107* (2013.01); *H04L 51/16* (2013.01); *H04L 51/36* (2013.01); *H04L 67/306* (2013.01); *H04M 1/72547* (2013.01); *H04M 1/576* (2013.01)

(58) Field of Classification Search
CPC ....... G06T 11/60; H04L 67/306; H04L 51/16; H04L 51/36; H04L 51/04; G06Q 10/10; G06Q 10/107; H04M 1/72547; H04M 1/576; G06F 3/0484
See application file for complete search history.

(56) References Cited

U.S. PATENT DOCUMENTS

| | | | |
|---|---|---|---|
| 7,343,561 B1 | 3/2008 | Stochosky et al. | |
| 8,046,014 B2 | 10/2011 | Donald et al. | |
| 8,341,726 B2 | 12/2012 | Denner et al. | |

(Continued)

FOREIGN PATENT DOCUMENTS

WO    WO 2013/151384    10/2013

*Primary Examiner* — Brian J. Gillis
*Assistant Examiner* — Javier O Guzman
(74) *Attorney, Agent, or Firm* — Haynes and Boone LLP

(57) ABSTRACT

A communication apparatus, a system, and a method are provided that allow in-context electronic communication. In particular, communications received by a user is organized with in-context information, such as pictures or profiles of senders or recipients, forwarding history of the communication, relationship among the senders or recipients, subject matter and flow of conversation, and the like. As such, the user may review the received communication in context. For example, a graphical interface may be provided to present received messages as graphical conversations among different characters or persons using their pictures. The graphical interface may depict participants, listeners, and speakers in different panels to represent a flow of group conversation. In an embodiment, the communication may be depicted in a story or comic based format to layout messages or comments from different people.

20 Claims, 6 Drawing Sheets

(51) Int. Cl.
    *G06Q 10/10*    (2012.01)
    *H04M 1/57*    (2006.01)

(56) References Cited

U.S. PATENT DOCUMENTS

| | | |
|---|---|---|
| 8,621,366 B1 | 12/2013 | Sampath |
| 2003/0101065 A1 | 5/2003 | Rohall et al. |
| 2003/0232312 A1 | 12/2003 | Newcom et al. |
| 2004/0068695 A1* | 4/2004 | Daniell ............... G06Q 10/107 715/234 |
| 2004/0119755 A1 | 6/2004 | Guibourge |
| 2004/0137884 A1 | 7/2004 | Engstrom et al. |
| 2005/0223328 A1* | 10/2005 | Ashtekar ............ H04N 21/235 715/706 |
| 2007/0255807 A1* | 11/2007 | Hayashi ............. H04L 67/306 709/219 |
| 2008/0079750 A1 | 4/2008 | Setlur |
| 2008/0120383 A1* | 5/2008 | Kumar ................ G06Q 10/107 709/206 |
| 2008/0189633 A1 | 8/2008 | Boyle et al. |
| 2009/0005011 A1 | 1/2009 | Christie et al. |
| 2009/0172109 A1* | 7/2009 | Weir ...................... H04L 51/00 709/206 |
| 2009/0319619 A1 | 12/2009 | Affronti et al. |
| 2010/0153855 A1 | 6/2010 | Roberts et al. |
| 2010/0255865 A1 | 10/2010 | Karmarkar |
| 2010/0299399 A1* | 11/2010 | Wanser ............... G06Q 10/107 709/206 |
| 2012/0079033 A1* | 3/2012 | Vuong ................ G06Q 10/107 709/206 |
| 2012/0278164 A1 | 11/2012 | Spivack et al. |
| 2013/0086480 A1 | 4/2013 | Sirpal et al. |
| 2013/0275383 A1* | 10/2013 | McLarty ............. G06Q 10/107 707/663 |
| 2014/0096033 A1 | 4/2014 | Blair |
| 2014/0143684 A1 | 5/2014 | Oh et al. |
| 2015/0302098 A1* | 10/2015 | Hern .................. G06F 16/9535 707/708 |

\* cited by examiner

COMMUNICATION APPARATUS WITH IN-CONTEXT MESSAGING

CROSS-REFERENCE TO RELATED APPLICATIONS

This application is a continuation of U.S. patent application Ser. No. 14/527,391, filed Oct. 29, 2014, which is herein incorporated by reference in its entirety.

BACKGROUND

Field of the Invention

The present invention generally relates to a communication apparatus, and in particular, systems and methods for implementing in-context messaging with the communication apparatus.

Related Art

With the popularity of electronic communication, such as emails or text messaging, users are sending and receiving large numbers of communications or messages each day. As such, it may become difficult for a user to keep track of or manage various conversations with different users with a large communication volume. Thus, there is a need for an apparatus or system that helps the user manage various electronic communications and provide context to messages that are sent or received electronically by the user.

Figure 1:
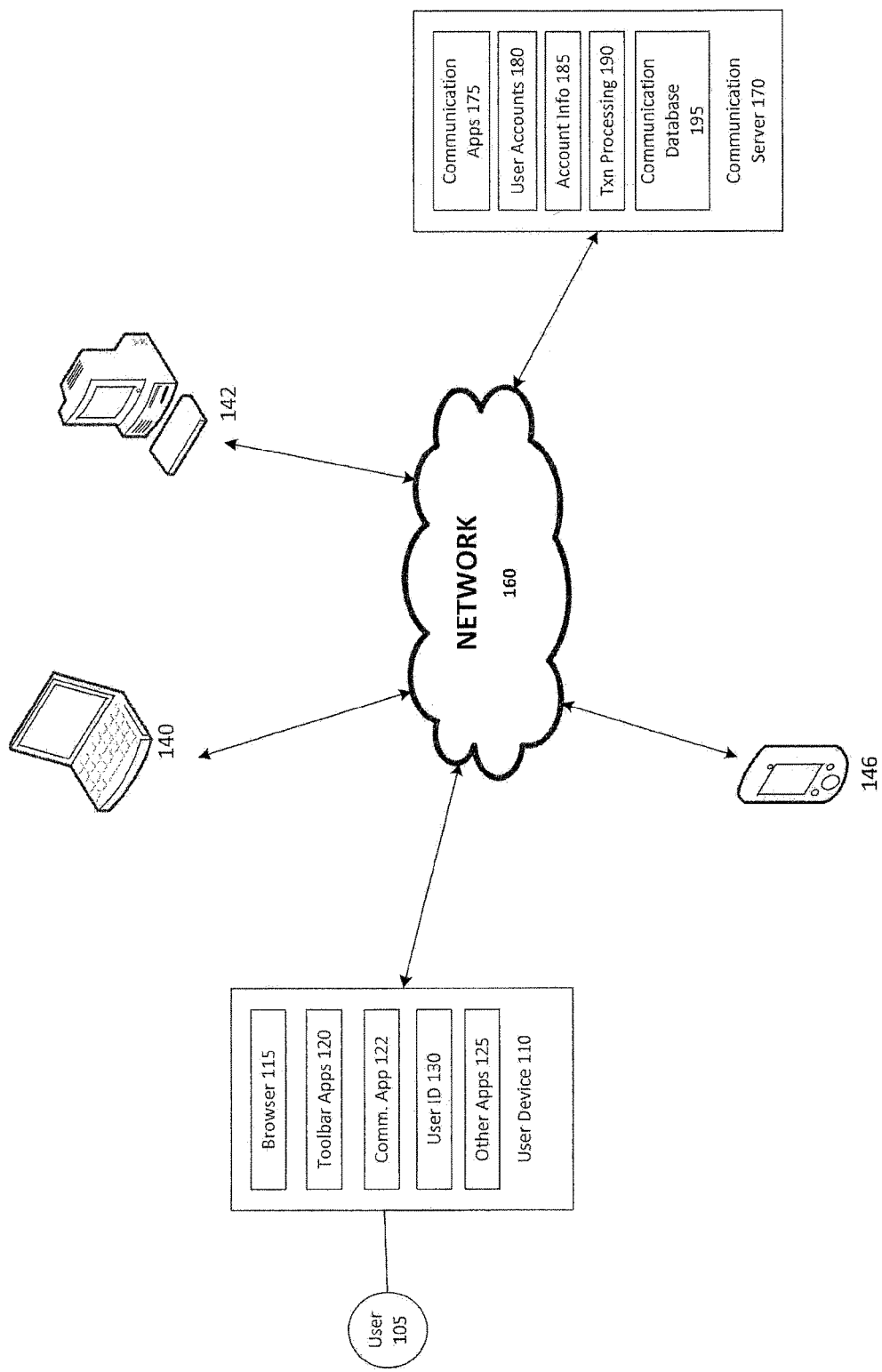
FIG. 1 is a block diagram of a networked system suitable for implementing in-context communication according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a communication apparatus, a system, and a method are provided that allow in-context electronic communication. In particular, communications received by a user is organized with in-context information, such as pictures or profiles of senders or recipients, forwarding history of the communication, relationship among the senders or recipients, subject matter and flow of conversation, and the like. As such, the user may review the received communication in context. For example, a graphical interface may be provided to present received messages as graphical conversations among different characters or persons using their pictures. The graphical interface may depict participants, listeners, and speakers in different panels to represent a flow of group conversation. In an embodiment, the communication may be depicted in a story or comic based format to layout messages or comments from different people.

In an embodiment, the system may allow the user to designate how various incoming messages should be ordered or related to provide meaning. In an example, a graphical interface may be provided to allow the user to easily designate recipients that will be included and/or quoted in a subsequent communication, such as performing a "right click" on a person's image or comments.

In an embodiment, the system may allow the user to designate relationships or dependencies among different communication strings or trails. The system may enforce these relationships or dependencies, such that a particular comment may not be quoted without also including certain comments so that they are no taken out of context in subsequent communications.

In an embodiment, the system may allow the users to set rules and dependencies for different people and different communication types and situations. Certain people or comments may be included or excluded for subsequent communications based on the rules or dependencies. The rules or dependencies may be determined based on an organization chart of a group, the subject matter of the conversation, a flow of the conversation, the location (e.g., home, office, public WiFi spot, etc.) of the displayed conversation, and the like, automatically by the system and/or as determined by a user.

In an embodiment, different levels of information may be provided to different people based on their position in an organization or relational chart. For example, recipients who are relationally closer to a sender may be presented with more information. In another example, recipients who have higher positions in an organizational chart may be presented with more information. The type of relationship between users (e.g., between close friends or family members, between work colleagues, between an employee and a supervisor, etc.) may determine information in an electronic conversation. As such, both recipients and senders in an electronic communication or conversation may have a more efficient, appropriate, or otherwise better experience.

In an embodiment, the system may allow a user to construct a visual message. In particular, when the user is composing a new message, the system may allow user to use images of senders and recipients to contract a comic style conversation. Further, the system may allow the user to refer to another message thread or another story. As such, full or part of another message thread may be inserted into the user's visual story.

FIG. 1 is a block diagram of a networked system 100 suitable for implementing in-context communication according to an embodiment. Networked system 100 may comprise or implement a plurality of servers and/or software components that operate to perform various communications or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, other communication devices 140, 142, 146, and a communication server 170 in communication over a network 160. Communication server 170 may be maintained by a communication service provider, such as a messaging service provider or an email service provider. A user 105, such as a sender or receiver of communication, may utilize user device 110 to perform communications via communication server 170. User 105 may utilize user device 110 to initiate a communication, receive a communication, or reply to a communication. Note that communication, as used herein, refers to any suitable communications performed using the user device 110, including emails, messaging, chats, social media messaging, social media postings, etc. For example, user 105 may utilize user device 110 to compose and send a message to one or more recipients. Although only one communication server 170 is shown, a plurality of communication servers may be utilized.

User device 110, communication devices 140, 142, 146, and communication server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, messages, chats, online postings, and texts through network 160, as well as communication devices (wireless or wired) that enable the user to communicate and transfer information. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a communication service provider to associate user 105 with a particular communication or messaging account maintained by the communication service provider. A communications application 122, with associated interfaces, enables user device 110 to communicate within system 100.

Communication devices 140, 142, and 146 may be owned or operated by other users who may communicate with user 105 via network 160. Communication devices 140, 142, and 146 each may have one or more similar components as that of user device 110 and may be configured to implement various types of electronic communication. For example, communication device 140 may be a laptop computer configured to implement wired or wireless communication with other devices via network 160. Similarly, communication device may be a desktop computer and communication device 146 may be a mobile cellular phone, such as a smart phone.

Communication server 170 may be maintained, for example, by a communication service provider which may provide communication between user 105 and other users or operators of communication devices 140, 142, and 146. In this regard, communication server 170 may include one or more communication applications 175 which may be configured to interact with user device 110 and/or communication devices 140, 142, and 146 over network 160 to facilitate communication and/or display information.

Communication server 170 also maintains a plurality of user accounts 180, each of which may include account information 185 associated with users or groups. For example, account information 185 may include personal information of users of devices such as communication address, account numbers, passwords, device identifiers, user names, phone numbers, or financial information which may be used to facilitate online transactions by user 105.

A communication processing application 190, which may be part of or separate from communication application 175, may be configured to receive information from user device 110 and/or communication devices 140, 142, and 146 for processing and storage in a communication database 195. Communication processing application 190 may include one or more applications to process information from user 105 for providing context, dependencies, and relationships among different communications and different users. As such, communication processing application 190 may store details of communications among individual users, including context information, dependencies, relationships, etc. Communication application 175 may be further configured to determine the existence of and to manage accounts for user 105, as well as create new accounts if necessary.

Figure 2:
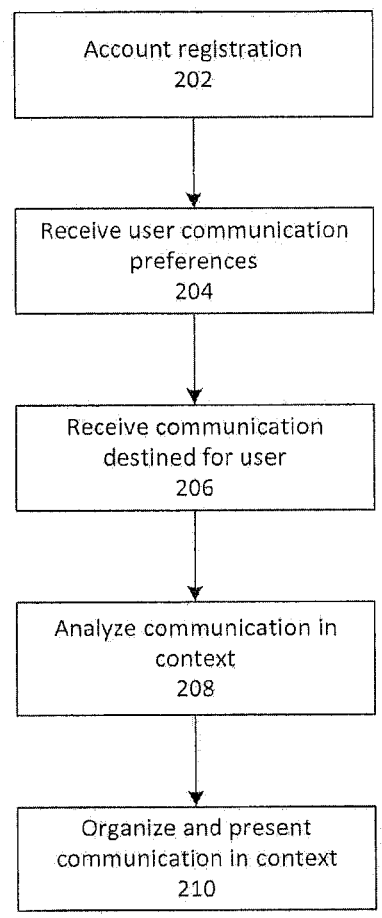
FIG. 2 is a flowchart showing a process for setting up an account for in-context communication according to one embodiment.

FIG. 2 is a flowchart showing a set up process 200 for in-context communication according to one embodiment. At step 202, communication server 170 may register user 105 by setting up a communication or messaging account at communication service provider. User 105 may provide communication service provider with various personal information, such as name, contact information, user name, password, and the like. In an embodiment, user 105 may use user device 110 to download a communication application from the communication server 170. The communication application may allow user to implement and manage various communications using the user device 110.

At step 204, the communication server 170 or the user device 110 may receive user 105's preferences. For example, the user 105 may choose whether to utilize in-context communication. The user 105 may be allowed to choose how received communications and/or messages are presented to the user 105, such as in a textual format or in a graphical comic or story style. The user 105 also may choose how outputting communications or messages should be formatted or composed, and what kind of in-context information should be included in the communication. The user 105 also may upload context information to the communication server 170, such as an organizational chart, social relationship profiles, contact information, contact list, and the like. The communication server 170 may analyze this information to determine context for communications received or sent by the user 105 and provide suggestions to user 105 if desired.

At step 206, the communication server 170 may receive communication destined for or sent by the user 105. The communication may be in various formats, such as emails, messages, chats, social media postings, and the like. At step 208, the communication server 170 may analyze the communication by natural language processing to determine the content and the context of the received communication. For example, incoming emails may be analyzed to determine whether it is related to a previous communication, such as a reply to a previous communication sent by the user 105. In another example, the sender and/or the recipients of the communication may be analyzed based on the user 105's social media account, contact list, and/or organizational chart.

At step 210, communication server 170 may organize and present the received communication to the user 105 (if the recipient) or to a recipient (if user 105 is the sender) with the in-context information. For example, the communication server 170 may find the sender's pictures and/or profiles from the user 105's contact list or social networking account. The communication server 170 also may find other recipient's pictures and/or profiles from the user 105's contact list and/or social networking account. Relationship between the sender and the user 105 and/or between the other recipient's and the user 105 also may be determined similarly. The additional information may be presented to the user along with the communication to provide context.

Figure 5:
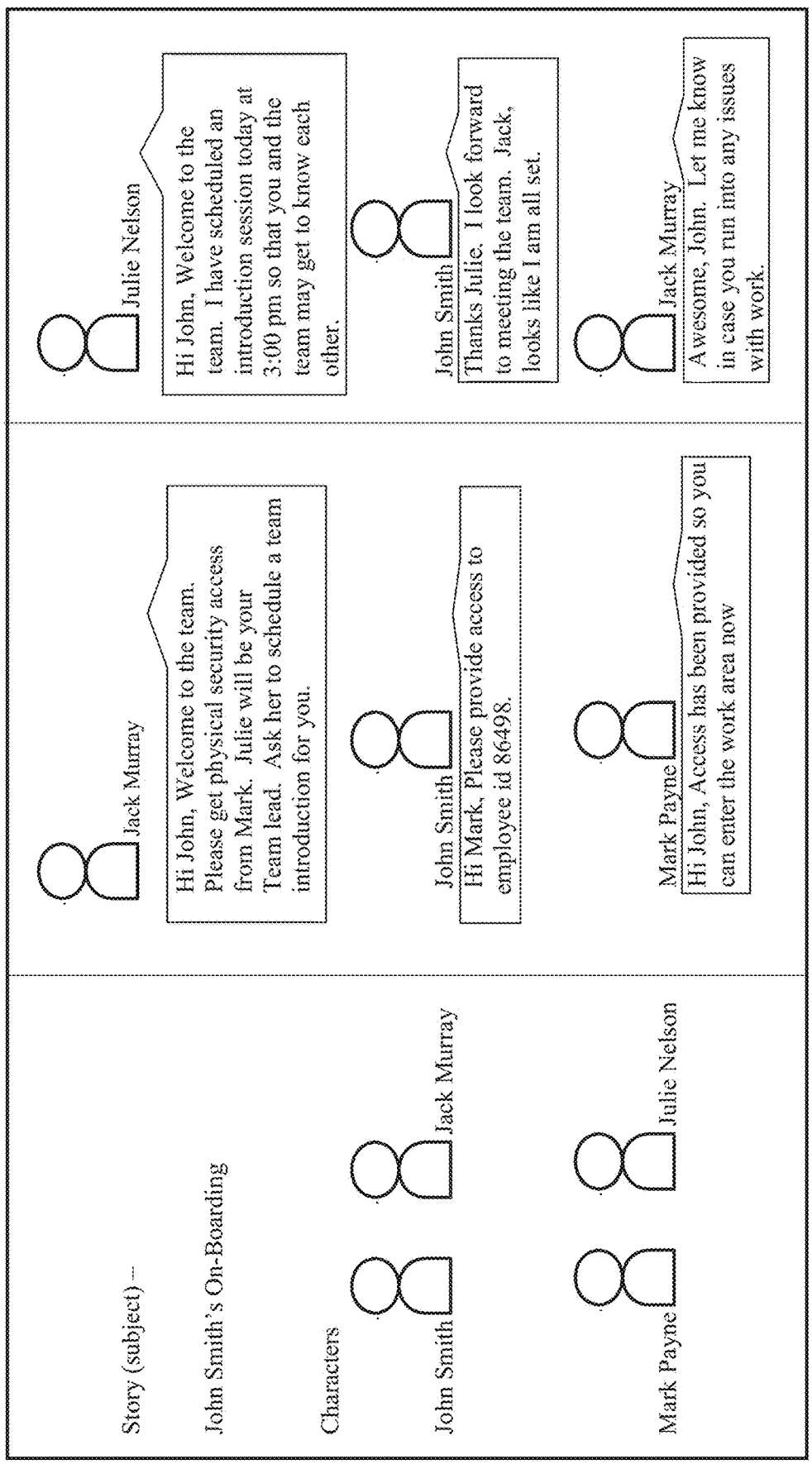
FIG. 5 is a diagram depicting a user interface presenting in-context communications according to one embodiment.

FIG. 5 is a diagram depicting a user interface presenting in-context communications according to one embodiment. A left side panel may include parties involved in a string or a series of communications including senders and recipients. For example, the characters may include John Smith, Jack Murray, Mark Payne, and Julie Nelson. Their respective pictures also may be presented with their name in the left side panel to help the user associate the name with a facial image of the various participants in the conversation.

The subject matter of the conversation, such as John Smith's On-Boarding, may also be determined and presented to the user. For example, the subject matter may be determined based on the title of the email chains or from content of the emails using natural language processing.

Each communication may be presented as a panel with the pictures of the senders and recipients. A bubble including the content or a brief summary of the content of the message may be presented to indicate who is making or speaking the comments or messages. The pictures of the recipients also may be presented to indicate who received the particular communication. In an embodiment, the direct recipients are shown in the panel, but the recipients who are carbon copied (CC) are not shown in the panel. Expressions of the senders may also be changed based on the content, tone, or other information about the electronic conversation and/or the sender and recipient. For example, if the message is seen as sarcastic or a joke (such as shown by smiley faces, best friend relationship between the sender and recipient(s), etc.), the sender may be shown with a smiling or winking face, and if the message is angry (such as with all capital letters, exclamation points, etc.), the image of the sender may be of an angry person.

The related series or stream of communications and replies among the group may be presented in a series of panels with pictures of the senders and recipients. In an embodiment, immediate communications and replies may be grouped into the same panel. In an embodiment certain communication and replies may be bundled together or tied to each other such that they may provide context to each other. For example, the comment "Hi Mark, Please provide access to employee id 86498" may be tied to (such as shown directly next to) the reply "Hi John, Access has been provided so you can enter the work area now," even though there may have been other messages between those two messages. As such, they may provide proper context to each other.

Figure 3:
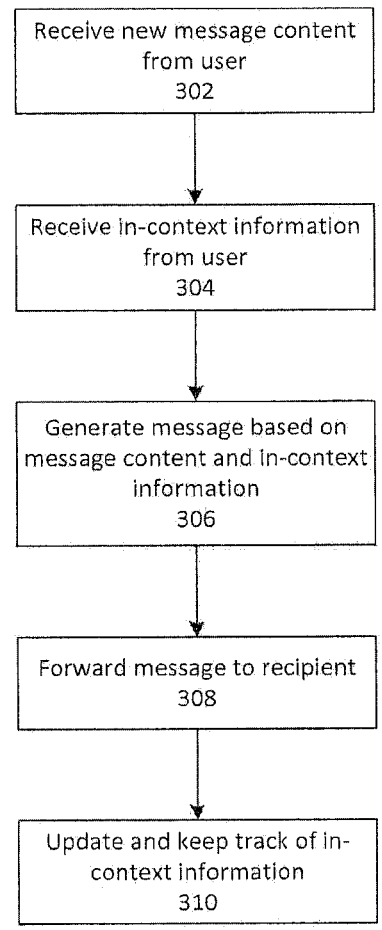
FIG. 3 is a flow chart showing a process for implementing in-context communication in accordance with one embodiment.

FIG. 3 is a flow chart depicting a process for implementing in-context communication according to an embodiment. At step 302, the communication server 170 may receive new message content from the user 105. For example, the user 105 may utilize user device 110 to compose a new message by entering text, images, data files, and the like at user device 110. The new message may be various types of communication in various formats, such as emails, text messages, social media postings, social media messaging, blogging, online postings, and the like.

In an embodiment, while authoring a new communication message, the system may automatically place a caricature of the originator with an overhead bubble which may contain the content of the message. The recipients may also be shown as audience (caricatures). The size of a communication box (as in a comic) may increase as more recipients are added. If the recipient is a distribution list which has many recipients (companywide or group wide communication), such distribution list may be represented by a single caricature image representing that distribution list, such as a group logo or a company mark.

In an embodiment, while in the middle of a communication thread, if the user wishes to refer to another message thread, the system may provide the user with the capability to insert another message thread in-line (in part or whole) as a visual story. Thus, each story (in part or whole) may be plugged in-line as needed in any message. If imported in parts, the inserted parts may still retain links to the original story and so recipients interested in reading the whole story may be able to do so by accessing the link.

In an embodiment, when forwarding messages, the user may have the option to selectively import specific parts or whole stories into the new message thread being started. If imported in parts, the parts may still retain links to the original story and so recipients interested in reading the whole story may be able to do so by accessing the link.

At step 304, the communication server 170 may receive in-context information from the user 304. In an embodiment, the communication server 170 may determine whether the newly composed message is related to other messages previously sent or received by the user 105. For example, the communication server 170 check to see if the new message is in reply to another message or is forwarded based from another message. In an embodiment, the communication server 170 may access the user 105's calendar, contact list, and/or social networking accounts to determine relationships between the user 105 and the recipients of the message.

Figure 6:
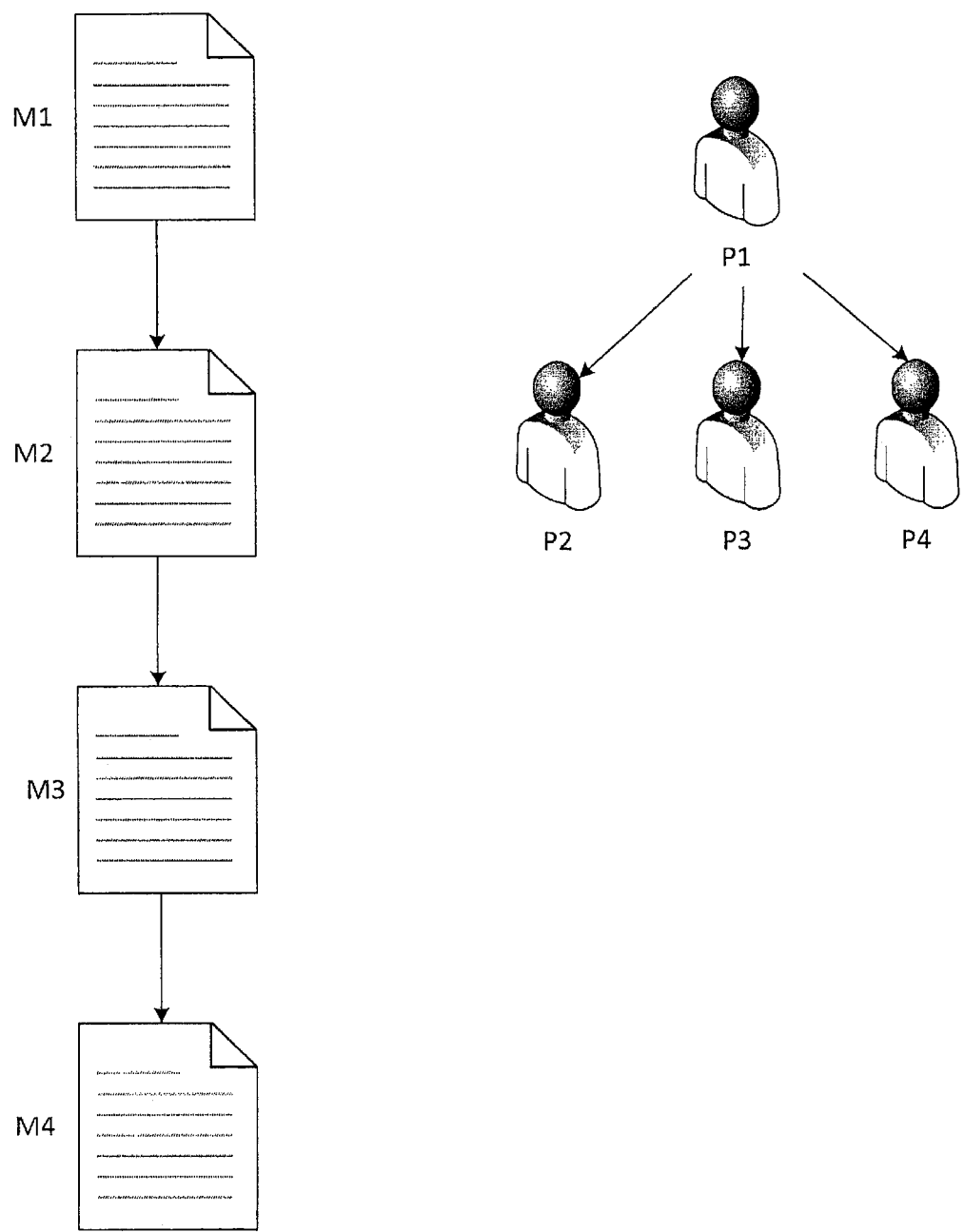
FIG. 6 is a diagram depicting a user interface for managing communications according to an embodiment.

In an embodiment, the communication server 170 or the user device 110 may present a graphical interface that allows the user 105 to input in-context information to the communication. For example, as shown in FIG. 6, a diagram illustrates a graphical interface for managing in-context communications. The graphical interface may present a series of related messages from M1 to M4, such as a chain of emails among different senders and recipients. The messages may be connected by arrows indicating the flow of conversation in chronological order.

When a message is selected, such as by a clicking, tapping, or mouse over, a graphical representation of the senders and recipients may be presented to the user. For example, as shown in FIG. 6, when M1 is selected, a graphical representation of P1, as sender, and P2, P3, and P5, as recipients, may be displayed, illustrating P1 sending M1 to P2, P3, and P5, by pictures of the people and arrows showing direction of communication. Thus, the user 105 may be able to review and have context on each message.

The system may allow the user 105 to designate how each message in the stream of messages should be related and the dependencies among the different messages. For example, the user 105 may designate that message M3 should be dependent from message M2 or should be bound to M2, such that they should be forwarded or quoted together in subsequent communications. For example, whenever message M3 (or M2) is forwarded, message M2 (or M3) is automatically attached to the forwarded message. In an embodiment, the sender or originator of a message may be the one who has the authority or right to determine the context or dependency of that message. For example, if the user 105 is composing a new message M5 in reply to M4, the user 105 may designate that message M5 is dependent from M4 and should be quoted or forwarded together in subsequent messages. As such, when other users later forward or quote message M5, message M4 may be automatically forwarded together or quoted together. As such, message M5 may not be taken out of context.

In an embodiment, the system may allow user 105 to designate persons who should be included or excluded when a message is forwarded or quoted. For example, the user 105 may designate P1 to be included in subsequent communications that include message M4 and may designate P3 to be excluded in subsequent communications that include message M2. Thus, relevant messages may be forwarded or quoted to communications involving the relevant people.

Each message may have its own policy and rules on what other messages or in-context information is to be included when the message is forwarded or quoted and what persons should be included or excluded as recipients in subsequent communications. The composer or originator of a message may have the full right to add or modify the policy or rules of the message. In an embodiment, the right to add or modify the rules or policies of a message may be determined based on an organization chart of a group. For example, people at a higher hierarchy in an organization chart, such as managers, may be granted more rights to add or modify the rules or policies of communications within their group. In an example, a composer or originator of a message may indicate that the message cannot be decomposed, such that anyone forwarding the message cannot parse out portions, but instead must send the entire message as it was composed. In another example, the composer may allow certain types of editing or parsing, which can depend on the person doing the forwarding.

In an embodiment, the message may be presented differently to different recipients based on the rules and policies of the message. For example, a message may include information pertaining to department A and department B, the system may present information related to department A to recipients in department A and may present information related to department B to recipients in department B. In an embodiment, the information in the message may be rearranged such that the more relevant information may be presented first. For example, information related to department A may be presented first before information related to department B in the messages sent to recipients in department A. In an embodiment, relevant portions in the message may be highlighted for the recipient. For example, information related to department A may be highlighted in messages sent to recipients in department A.

In an embodiment, the message may have different amounts or types of content based on the recipients. For example, if a recipient is new to a chain of messages, the system may provide the entire history of the chain in the message, such that the newly added recipient may review the history to understand the context of the conversation. If a recipient has been involved in the conversation, the system may include one or few previous messages, because the recipient has been involved and may not need the entire chain history of the conversation, especially if the recipient has been involved in the conversation, as opposed to a recipient who was part of the group, but never responded or opened the messages.

The user 105 may utilize the graphical interface, as shown in FIG. 6, to compose a new message and implement rules or policies for the new message. For example, the user 105 may select and drag different messages to link or create dependencies or relationship among them. The user 105 also may select images of different users to include or exclude them from subsequent communications. This may provide a convenient way for the user 105 to visualize the different dependencies or relationships among different messages or persons.

At step 306, the communication server 170 or the user device 110 may generate messages based on the message content received from the user 105 and the rules and policies for in-context communication. For example, based on the rules and policies, the system may generate different types or styles of message for different recipients. The system may include or exclude certain content and may include or exclude certain recipients accordingly. In an embodiment, certain portions of the message content may be highlighted for different recipients or the portions of the message content may be rearranged in different orders based on different recipients.

If the system detects that certain content or recipients need to be included or excluded based on the rules and policies, the system may automatically add or delete certain content accordingly. When the message or the recipient lists are altered, the system may inform the user 105 about the changes to the message and the reason for the changes. If the user 105 does not accept the changes, the system may prohibit the message from being sent until the user 105 changes the rules and policies or requests the authorized person to change the rules and policies.

At step 308, the system may forward the generate messages to the appropriate recipients. The messages may be forwarded via different communication channels as appropriate. In an embodiment, the messages may be forwarded in a communication channel available to a recipient. For example, the same message may be forwarded via email to a recipient who has a communication device that accepts email and may be forwarded via text messaging to a recipient who has a mobile device that accepts text messaging.

At step 310, the communication server 170 and/or the user device 110 may continue to update and keep track of rules or policies of various messages for in-context communication. In particular, the system may review and analyze newly composed messages to ensure they satisfy the rules and policies. For example, based on the rules and policies for in-context communication, a message may not be quoted or forwarded without another message also being quoted or forwarded. In another example, certain recipients may be included or excluded when certain messages are forwarded or quoted based on the rules and policies set for the message. The system may keep track of the rules and policies of each message to ensure that appropriate contents are included and forwarded to appropriate recipients to provide proper context for the message. The system may dynamically change rules and policies based on what users do with messages in an electronic conversation, such that a user may not need to manually change a rule or policy, but have it automatically changed or notified to the user based on user actions.

Figure 4:
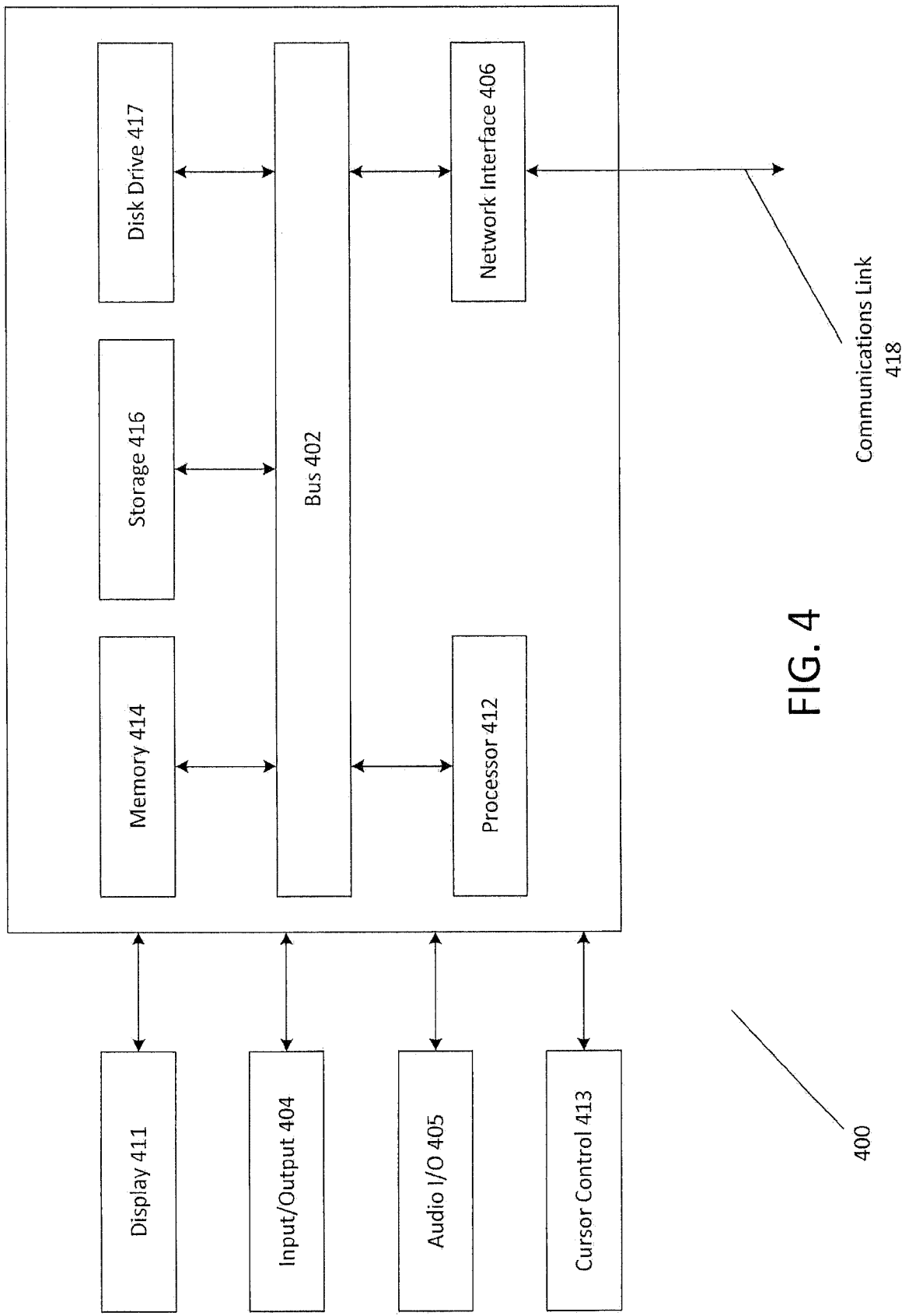
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
determining that a first message intended for a first user is received at a first user device of the first user;
determining that the first message is related to one or more messages previously received or sent by the first user based on context information from the first message;
providing, on the first user device of the first user, a user interface that presents the first message and the one or more messages together;
receiving, from the first user via the user interface, a request to forward the first message to a second user;
determining a second message from the one or more messages to forward with the first message based on a communication policy of the first message, wherein the communication policy comprises a restriction that the second user cannot remove the first message when the first message and the attached second message are forwarded by the second user;
automatically attaching the second message to the first message, wherein the user interface disallows the first user from removing the second message from the first message before forwarding the first message to the second user; and
forwarding the first message and the attached second message to a second user device of the second user.

2. The system of claim 1, wherein the operations further comprise:
receiving an indication for attaching a third message from the one or more messages to the first message for forwarding to the second user; and
based on the communication policy of the first message, preventing the third message from being attached to the first message.

3. The system of claim 1, wherein the one or more messages are associated with one or more senders of the one or more messages, and wherein the operations further comprise presenting caricatures of the one or more senders along with the one or more messages on the user interface.

4. The system of claim 1, wherein the one or more messages comprise a plurality of messages, wherein the operations further comprise:
determining that a first plurality of the plurality of messages are associated with a first conversation and that a second plurality of the plurality of messages are associated with a second conversation based on context information derived from the plurality of messages; and
configuring the user interface to present the first plurality of the plurality of messages and the second plurality of the plurality of messages as distinct groupings of messages.

5. The system of claim 1, wherein the first message and the one or more messages are presented in a comic style graphical representation on the user interface.

6. A method, comprising:
receiving, by one or more hardware processors, a first message intended for a first user;
determining, by the one or more hardware processors, that the first message is dependent on a second message previously received or sent by the first user based on a communication policy associated with the first message;
providing, by the one or more hardware processors on a first user device of the first user, a user interface that presents the first and second messages;
receiving, by the one or more hardware processors via the user interface, a request to quote the first message in a third message to be sent to a second user; and
automatically quoting, by the one or more hardware processors, the first message and the second message in the third message before sending the third message to a second user device of the second user based on the communication policy associated with the first message, wherein the user interface prevents the first user from removing the second message from the third message before sending the third message to the second user device, and wherein the communication policy further comprises a restriction that the second user cannot remove the second message when forwarding the third message to a third user.

7. The system of claim 1, wherein the first message was sent by a third user to the first user, and wherein the operations further comprise:
presenting, on the user interface, an image representing the third user in association with the first message;
identifying one or more characteristics associated with the first message indicating a tone of the first message; and
adjusting at least one of the image or a presentation of the first message on the user interface based on the tone.

8. The method of claim 6, further comprising:
presenting, on the user interface, an image representing the second user in association with the second message;
identifying one or more characteristics associated with the second message indicating a tone of the second message; and
adjusting at least one of the image or a presentation of the second message on the user interface based on the tone.

9. The method of claim 8, wherein the image comprises a face representing the second user, and wherein the adjusting comprises changing an expression of the face on the image.

10. The method of claim 6, further comprising:
determining that the first message and the second message are part of a conversation between the first user and the second user;
determining a subject matter associated with the conversation based on analyzing the first and second messages; and
presenting, on the user interface, the subject matter associated with the conversation.

11. The method of claim 6, further comprising transmitting the third message to the second user device of the second user.

12. The method of claim 11, further comprising removing a portion of at least one of the first message or the second message quoted in the third message based on an identity of the second user.

13. A non-transitory machine-readable medium having stored thereon machine-readable instructions executable to cause a machine to perform operations comprising:
receiving a first message intended for a first user;
deriving context information from the first message;
determining that the first message is related to one or more messages previously received or sent by the first user based on the derived context information;
providing, on a first user device of the first user, a user interface that presents the first message and the one or more messages together;
receiving, from the first user via the user interface, a request to forward the first message to a second user; and
automatically attaching a second message from the one or more messages to the first message before forwarding the first message and the attached second message to a second user device of the second user based on a communication policy of the first message, wherein the user interface prevents the first user from removing the second message from the first message before forwarding the first message to the second user, and wherein the communication policy further comprises a restriction that the second user cannot remove the second message from the first message when the first message is forwarded by the second user.

14. The non-transitory machine-readable medium of claim 13, wherein the operations further comprise:
forwarding the first message and the communication policy of the first message to the second user device of the second user.

15. The non-transitory machine-readable medium of claim 13, wherein a requested third message from the one or more messages is not attached to the first message for forwarding to the second user based on the communication policy of the first message.

16. The non-transitory machine-readable medium of claim 13, wherein the one or more messages are associated with one or more senders of the one or more messages, and wherein the operations further comprise presenting images of the one or more senders along with the one or more messages on the user interface.

17. The non-transitory machine-readable medium of claim 13, wherein the one or more messages comprise a plurality of messages, wherein the operations further comprise:
determining that a first plurality of the plurality of messages are associated with a first conversation and that a second plurality of the plurality of messages are associated with a second conversation based on context information derived from the plurality of messages; and
configuring the user interface to present the first plurality of the plurality of messages and the second plurality of the plurality of messages as distinct groupings of messages.

18. The non-transitory machine-readable medium of claim 13, wherein the first message and the one or more messages are presented in a comic style graphical representation on the user interface.

19. The non-transitory machine-readable medium of claim 13, wherein the operations further comprise transmitting the first message to a third user device of a second user based on a request received from the second user.

20. The non-transitory machine-readable medium of claim 19, wherein the operations further comprise removing a portion of the second message quoted in the first message based on an identity of the third user before transmitting the first message to the third user device.

* * * * *